C. H. DONNER.
MACHINE FOR GRINDING HELICAL BLADES.
APPLICATION FILED DEC. 27, 1919.
1,362,239.
Patented Dec. 14, 1920.
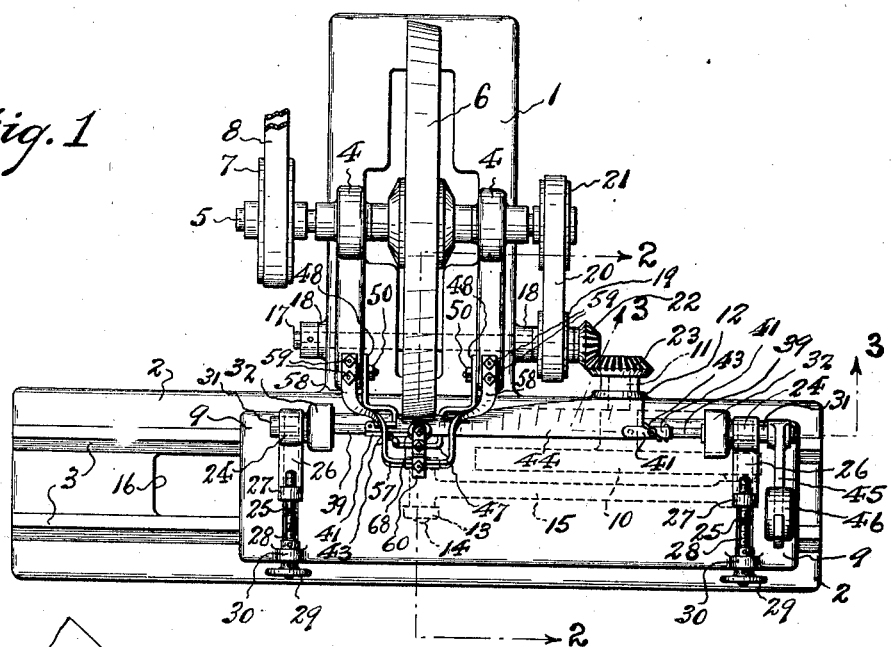
INVENTOR
Carl H. Donner,
BY
Frantz & Richards
ATTORNEYS

UNITED STATES PATENT OFFICE.

CARL H. DONNER, OF SUMMIT, NEW JERSEY.

MACHINE FOR GRINDING HELICAL BLADES.

1,362,239.   Specification of Letters Patent.   Patented Dec. 14, 1920.

Application filed December 27, 1919. Serial No. 347,686.

*To all whom it may concern:*

Be it known that I, CARL H. DONNER, a citizen of the United States, residing at Summit, in the county of Union and State of New Jersey, have invented certain new and useful Improvements in Machines for Grinding Helical Blades; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to automatic grinding machines; and the invention has reference, more particularly, to a very simple, efficient and accurate automatic grinding machine for grinding and resharpening helical cutter blades, such, for example, as are used upon fur cutting and hide dehairing machines.

The invention has for its principal object to provide a grinding machine having a novel construction of work holding and guiding means for supporting and guiding a helical blade as the same is moved longitudinally back and forth to carry the blade edge in contact with and across the grinding or abrading wheel, whereby all portions of the helical cutting edge of the blade are evenly carried into operative contact with the grinding wheel.

Other objects of the present invention, not at this time more particularly enumerated, will be clearly understood from the following detailed description of the same.

With the various objects of the present invention in view, the same consists, primarily, in the novel grinding machine hereinafter set forth; and the invention consists, furthermore, in the novel arrangements and combinations of the various devices and parts, as well as in the details of the construction of the same, all of which will be hereinafter more fully described, and then finally embodied in the claims appended hereto.

The invention is clearly illustrated in the accompanying drawings, in which:—

Figure 1 is a plan view of the grinding machine made according to and embodying the principles of my present invention; Fig. 2 is a detail cross-section of the blade holding and guiding means, taken on line 2—2 in said Fig. 1, the same being drawn on an enlarged scale; Fig. 3 is a detail longitudinal-section taken on line 3—3 in said Fig. 1, also drawn on an enlarged scale, and illustrating a universal or resilient blade clamp support; Fig. 4 is a transverse section on line 4—4 in Fig. 3 on a larger scale; and Fig. 5 is a detail view of a universal joint for use in connection with the blade clamps of the machine as an alternative for the resilient support illustrated in Fig. 3.

Similar characters of reference are employed in all of the hereinabove described views to indicate corresponding parts.

Referring now to said drawings, the reference-character 1 indicates a suitable base upon which the mechanism of the machine is mounted, said base having at its forward end a laterally extending bed-plate 2 provided with longitudinally arranged track members or guideways 3 thereon. Connected with said base 1 are a pair of bearing members 4 in which is journaled a shaft 5. Fixed upon said shaft 5, so as to be rotated thereby, is a grinding wheel 6. Said shaft 5 is provided at one end with a driving pulley 7, over which runs a driving belt 8 operated from any suitable source of power.

Arranged to ride upon said track members or guideways 3 of said bed-plate 2 is a reciprocating table 9 adapted to travel back and forth in front of said grinding wheel 6. The means for reciprocating said table 9 comprises a crank-wheel 10 mounted upon a shaft 11 journaled in a bearing 12 to position said crank-wheel beneath said bed-plate 2. Said table 9 is provided upon its under side with properly positioned lugs 13 adapted to support a wrist-pin 14 upon which is pivotally connected one end of a connecting rod 15, the opposite end of which is pivotally connected with the crank-wheel 10, so that when the latter is rotated a reciprocating movement will be transmitted to said table by said connecting rod. Said bed-plate 2 is provided with a suitable opening 16, through which said connecting rod may pass to its connected relation with said table, and through which the connecting rod plays during the operation thereof. The transmission means for operating said crank-wheel 10 comprises a counter-shaft 17 journaled in bearings 18 connected with said base 1. Fixed on said counter shaft 17 is a pulley 19 over which runs a transmission belt 20 driven by a pulley 21 fixed upon and rotated by said grinding wheel shaft 5. Secured upon the end of said counter-shaft 17 is a bevel gear 22 which meshes with and drives another bevel gear 23 fixed on the end of said crank-wheel shaft 11, so that the rotary movement imparted to said counter shaft 17 is transmitted to said crank wheel 10. The above described means for reciprocating the table 9, and transmission means therefor, is merely illustrative of one mechanical arrangement adapted for the purpose, hence, I do not wish to be understood as limiting myself specifically thereto, since in its broader aspects my invention embraces novel work holding and guiding means mounted on a reciprocating table, regardless of the specific means for producing the table movement, whether by hand, or by mechanical means the same or other than that above described.

The novel work holding and guiding means adapted to be used with the machine, comprises a pair of bearing brackets 24 mounted for slidable adjusting movement transversely of the table 9 in guide grooves 25 with which the table is provided. Said bearing brackets have tail-pieces 26 provided with nut-lugs 27 to receive the screw-threaded shanks 28 of adjusting screws 29 mounted in holding lugs 30 at or adjacent to the outer edge of said table. Journaled in said bearing brackets 24 are journal members 31 having at their inner ends housings or boxes 32, provided within the same upon opposed sides with guide ribs 33. Movable vertically upon said guide ribs 33 of each housing or box 32 is a rectangular frame 34. Spring members 35 arranged between the sides of said frame 34 and the remaining sides of said housing 32 hold said frame yieldingly centered in said housing. The interior opening of said frame 34 provides a guideway 36 in which is transversely or horizontally movable a block 37. Spring members 38 arranged between the sides of said block and the ends of said frame 34 hold said block yieldingly centered in said frame. Rigidly connected with each block, so as to project outwardly from the center thereof, is a stud 39, terminating at its free end in a rigid or fixed clamp-jaw 40. Pivotally connected with said fixed clamp-jaw 40 is a movable clamp jaw 41, provided upon its inner surface, adjacent to its free end with a boss or tit 42. A thumb screw 43 passes through said movable jaw and screws into said fixed jaw, the same serving to draw said jaws together in rigidly held gripping or clamping position. The reference-character 44 indicates the helically shaped blade which is adapted to be mounted in the holding devices. Usually said blades possess adjacent to their ends, and in other places, along the back margin thereof, openings through which fastening screws are passed to fasten the blade in the drums of fur cutting or dehairing machines. In securing the blade in the holding devices of my novel grinding machine, the clamping or gripping means comprised in the jaws 40 and 41 are opened, and the ends of the blade 44 are placed therebetween, whereupon the jaws are closed so that the bosses or tits 42 of the jaws 41 enter openings adjacent to the said ends, the jaws then being secured in closed and gripping relation by the thumb-screws 43, whereby the blade is securely held against displacement. Since the holding devices are journaled in the bearing brackets 24, the blade thus held thereby is capable of a rocking, tilting or swiveling movement, whereby the cutting edge of the blade may be oscillated or rocked so that all points thereof will be caused to move in contact with the grinding wheel, as the same is carried longitudinally back and forth relative thereto. Connected with the outwardly projecting end of one of the journal members 31 is a lever arm 45, upon which is secured a counter-balance weight 46.

The novel guiding means for said blade comprises a bracket member 47 having arms 48. Said arms 48 straddle the grinding wheel and are adjustably secured through their slots 49 by bolts 50 to suitable portion of grinding wheel supporting base 1. As thus positioned said bracket member projects beyond the grinding wheel and over the inner margin of the table 9 beneath the blade 44, as the latter is operatively positioned and supported by the holding devices above described. Adjustably secured to said bracket member 47 through its slot 51 by means of a bolt 52, or other suitable fastening means, is a standard 53 to the upper end of which is secured an inwardly projecting journal stud 54 upon which is rotatably mounted a supporting wheel 55 having a grooved or channeled periphery 56 in which the rear edge of the blade 44 rides in supported relation thereto, as shown, more particularly in Fig. 2. To adjust the position of said supporting wheel 55 relative to the blade, horizontal inward or outward adjustment of the bracket member 47, as to its fixed relation to the base 1, may be made, coupled with vertical adjustments, up or down, of the standard 53, all of which will be understood from an inspection of said Fig. 2. As thus supported by the supporting wheel 55, the blade 44 projects upwardly, and slightly inwardly inclined, to position its cutting edge against the grinding face of the grinding wheel.

In order to cause the helically shaped blade to tilt or swivel, as it is moved longitudinally across the face of the grinding wheel, so that its curved cutting edge constantly travels in operative contact with said grinding wheel face, additional guiding or tracking means is provided, the same comprising a second bracket-member 57 having arms 58. Said bracket-member 57 is positioned above the bracket-member 47, and its arms 58 also straddle the grinding wheel, the same being secured by bolts 59 to a suitable portion of said base 1. Said bracket-member 57 projects beyond the grinding wheel above the blade 44, as the latter is operatively positioned and supported by the holding devices therefor. Secured to said bracket-member 57 is a carrier member having an upwardly projecting arm 60 from the lower end of which extends an inwardly projecting arm 61. Said upwardly projecting arm 60 of said carrier member is adjustably secured to said bracket-member 57 through its slot 62 by a bolt 63. Connected with said inwardly projecting arm 61 of said carrier member is a supporting piece 64, adjustably secured to the former through the slot 65 by the bolt 66. Connected with the free end of said supporting piece 64 is a downwardly projecting journal stud 67 upon which is rotatably mounted a tracker-roll 68 adapted to engage the back of the blade 44 at the point where the same engages the grinding wheel. The said tracker-roll 68 may be adjusted in proper relation to the blade 44 by vertical adjustment of said carrier member relative to the bracket member 57 and horizontal or inward and outward adjustment of the supporting piece 64 relative to said carrier member.

After the blade 44 is affixed to the holding devices, and the machine is set in motion, the following operations take place. The grinding wheel is rotated, and the table 9 is reciprocated in front of the revolving grinding wheel. The reciprocating table in moving from right to left carries the blade across the face of the grinding wheel, said blade being supported by the supporting wheel 55, and backed by the tracker roller 68. Since the holding devices engaged with the ends of the blade 44 are capable of a rocking or swiveling movement in the bearing brackets 24, the blade will be tipped or turned as it travels to cause the helical cutting edge to properly contact with the grinding wheel. In the right to left movement of the table 9 and blade 44, the pull of gravity upon the weight 46 will produce the outward tilting or turning movement of the blade, by forcing the rotation of the holding device with which the weight is connected, and such tilting and turning movement will be controlled by the riding contact of the body of the blade with the tracker roller 68, so that the shape of the helical blade itself furnishes the guide for the tilting or turning movement, and consequently the grinding of the cutting edge will be even and smooth, and of the same degree from end to end. In the left to right movement of the table 9 and blade 44, the tracker roller 68 forces the blade in inwardly tilting or turning movement toward the grinding wheel to maintain the cutting edge in operative contact with the latter, the turning movement of the blade being transmitted through the holding device to the weight 46 to return the same to normally raised position. In order to permit the ends of the blade 44, as held by the holding devices, to be capable of a limited lateral play, which due to the helical shape of the blade, and to the fact that the portion of the rear edge of the blade traveling on the supporting wheel 55 is held against lateral play, it is necessary that the holding devices be capable of yielding laterally more or less in a universal manner, so as to avoid too rigid holding of the blade, tending to unseat the same from the supporting wheel 55. To this end the housings 32, with the spring supported frames 34 capable of yielding lateral movements in one direction, and the spring supported blocks 37 capable of yielding lateral movements in the opposite directions, are provided. By such means the blade holding devices are yieldingly supported for lateral play, while yet capable of the necessary swiveling or rocking movements relative to the supporting bearing brackets 24. A possible modification of the means permitting lateral yielding or play of the holding devices, is comprised in the universal joint 69 (as shown in Fig. 4) which may be inserted between the studs 39 and journaled members 31, in place of the housings 32 with their movable frames and brackets.

I am aware that some changes may be made in the general arrangements and combinations of the several devices and parts of my present invention, as well as in the details of the construction of said parts, without departing from the scope of my invention as set forth in the foregoing specification and as defined in the claims. Hence, I do not limit my invention to the exact arrangements and combinations of the various devices and parts as described in said specification, nor do I confine myself to the exact details of the construction of said parts as illustrated in the accompanying drawings.

I claim:—

1. In a machine for grinding helically curved blades, a rotary grinding wheel, a reciprocating table adapted to travel at right angles to the grinding face of said grinding wheel, swiveling means mounted on said table, gripping means connected with said swiveling means for engaging the ends of a blade to secure the same in longitudinal extension between said swiveling means, a stationary supporting wheel having a grooved periphery for engaging the rear edge of the blade and upon which the blade rides, and a stationary tracker roller for engaging the back of said blade to control its swiveling movement to maintain its cutting edge in traveling contact with said grinding wheel.

2. In a machine for grinding helically curved blades, a rotary grinding wheel, a reciprocating table adapted to travel at right angles to the grinding face of said grinding wheel, swiveling means mounted on said table, gripping means connected with said swiveling means for engaging the ends of a blade to secure the same in longitudinal extension between said swiveling means, intermediate means permitting a yieldable universal lateral play of said gripping means relative to said swiveling means, a stationary supporting wheel having a grooved periphery upon which the rear edge of said blade rides, and a stationary tracker roller for engaging the back of said blade to control its swiveling movement to maintain its cutting edge in traveling contact with said grinding wheel.

3. In a machine for grinding helically curved blades a base, a rotary grinding wheel mounted on said base, a reciprocating table adapted to travel at right angles to the grinding face of said grinding wheel, swiveling means mounted on said table, gripping means connected with said swiveling means for engaging the ends of a blade to secure the same in longitudinal extension between said swiveling means, a supporting wheel having a grooved periphery upon which the rear edge of said blade rides, a bracket-member secured to said base to project in front of said grinding wheel and over said table, means carried by said bracket-member for rotatably mounting said supporting wheel in operative position, a tracker roller for engaging the back of said blade to control its swiveling movement to maintain its cutting edge in traveling contact with said grinding wheel, a second bracket member secured to said base, and means carried by said latter bracket member for rotatably mounting said tracker roller in operative position.

4. In a machine for grinding helically curved blades a base, a rotary grinding wheel mounted on said base, a reciprocating table adapted to travel at right angles to the grinding face of said grinding wheel, swiveling means mounted on said table, gripping means connected with said swiveling means for engaging the ends of a blade to secure the same in longitudinal extension between said swiveling means, intermediate means permitting a yieldable universal lateral play of said gripping means relative to said swiveling means, a supporting wheel having a grooved periphery upon which the back edge of said blade rides, a bracket-member secured to said base to project in front of said grinding wheel and over said table, means carried by said bracket member for rotatably mounting said supporting wheel in operative position, a tracker roller for engaging the back of said blade to control its swiveling movement to maintain its cutting edge in traveling contact with said grinding wheel, a second bracket member secured to said base, and means carried by said latter bracket member for rotatably mounting said tracker roller in operative position.

5. In a machine for grinding helically curved blades a base, a rotary grinding wheel mounted on said base, a reciprocating table adapted to travel at right angles to the grinding face of said grinding wheel, swiveling means mounted on said table, gripping means connected with said swiveling means for engaging the ends of a blade to secure the same in longitudinal extension between said swiveling means, intermediate means permitting a yieldable universal lateral play of said gripping means relative to said swiveling means, a supporting wheel having a grooved periphery upon which the back edge of said blade rides, a bracket-member secured to said base to project in front of said grinding wheel and over said table, a vertically adjustable standard supported by said bracket member means permitting horizontal adjustment of said bracket member, a journal stud connected with said standard for supporting said supporting wheel for rotation substantially in a vertical plane, a tracker roller for engaging the back of said blade to control its swiveling movement to maintain its cutting edge in traveling contact with said grinding wheel, a second bracket member secured to said base, a vertically adjustable carrier member secured to said second bracket member, a horizontally adjustable supporting piece secured to said carrier member, and a journal stud connected with said supporting piece for supporting said tracker roller for rotation substantially in a horizontal plane.

6. In a machine for grinding helically curved blades, a rotary grinding wheel, a reciprocating blade carrying means adapted to travel at right angles to the grinding face of said grinding wheel, means for holding said blade on said carrying means subject to pivotal movement in directions transversely of the blade body, a stationary supporting wheel in front of said grinding wheel upon which the rear edge of the blade is supported for endwise movement, and a stationary tracker-roller in back of the blade, the helical contour of the blade body when the latter is moved endwise and in engagement with said tracker roller producing a traveling engagement of the cutting edge thereof with the grinding face of said grinding wheel.

7. In a machine for grinding helically curved blades, a rotary grinding wheel, a reciprocating blade carrying means adapted to travel at right angles to the grinding face of said grinding wheel, means for holding said blade on said carrying means subject to pivotal movement in directions transversely of the blade body, a stationary supporting wheel in front of said grinding wheel upon which the rear edge of the blade is supported for endwise movement, a stationary tracker roller in back of the blade, the helical contour of the blade body when the latter is moved endwise and in engagement with said tracker roller producing a traveling engagement of the cutting edge thereof with the grinding face of said grinding wheel, and respective means for adjusting said supporting wheel and said tracker roller to said blade as mounted on said carrying means relative to the grinding face of said grinding wheel.

8. In a machine for grinding helically curved blades, a rotary grinding wheel, a reciprocating blade carrying means adapted to travel at right angles to the grinding face of said grinding wheel, means for holding said blade on said carrying means subject to pivotal movement in directions transversely of the blade body, a stationary supporting wheel in front of said grinding wheel upon which the rear edge of the blade is supported for endwise movement, a stationary tracker roller in back of the blade, the helical contour of the blade body when the latter is moved endwise and in engagement with said tracker roller producing a traveling engagement of the cutting edge thereof with the grinding face of said grinding wheel, respective means for adjusting said supporting wheel and said tracker roller to said blade as mounted on said carrying means relative to the grinding face of said grinding wheel, and means permitting lateral end play of the blade as mounted for said pivotal movement on said carrying means.

In testimony that I claim the invention set forth above I have hereunto set my hand this 18th day of December, 1919.

CARL H. DONNER.

Witnesses:
GEORGE D. RICHARDS,
FRED'K. C. FRAENTZEL.